United States Patent
Kuo

(10) Patent No.: US 11,879,565 B1
(45) Date of Patent: Jan. 23, 2024

(54) METHOD AND APPARATUS FOR VALVE CORE INSTALLATION/REMOVAL

(71) Applicant: Fieldpiece Instruments, Inc., Orange, CA (US)

(72) Inventor: Henry J Kuo, Orange, CA (US)

(73) Assignee: Fieldpiece Instruments, Inc., Orange, CA (US)

( * ) Notice: Subject to any disclaimer, the term of this patent is extended or adjusted under 35 U.S.C. 154(b) by 0 days.

(21) Appl. No.: 18/093,712

(22) Filed: Jan. 5, 2023

(51) Int. Cl.
    *F16K 43/00* (2006.01)

(52) U.S. Cl.
    CPC ...... *F16K 43/003* (2013.01); *F25B 2345/006* (2013.01)

(58) Field of Classification Search
    CPC .......... F16K 43/003; F25B 2345/006
    See application file for complete search history.

(56) References Cited

U.S. PATENT DOCUMENTS

| | | | | |
|---|---|---|---|---|
| 2,517,870 A | * | 8/1950 | Gump | E21B 34/02 166/85.1 |
| 4,599,776 A | * | 7/1986 | Haggard | B25B 13/48 81/55 |
| 4,706,357 A | * | 11/1987 | Ewing | B25B 27/24 29/213.1 |
| 6,253,436 B1 | * | 7/2001 | Barjesteh | B25B 27/24 29/213.1 |
| 6,901,947 B2 | | 6/2005 | Danielson et al. | |
| 8,899,254 B1 | * | 12/2014 | Weiler | F16L 41/06 81/53.2 |
| 9,448,140 B2 | | 9/2016 | Ulirch et al. | |
| 9,943,951 B2 | * | 4/2018 | Munguia | B25B 27/24 |
| 10,478,953 B2 | | 11/2019 | Green | |
| 11,549,612 B1 | * | 1/2023 | Jones | F16K 27/067 |
| 2014/0215786 A1 | | 8/2014 | Munguia | |
| 2020/0041060 A1 | | 2/2020 | Pearl, II et al. | |
| 2020/0269400 A1 | | 8/2020 | Jones | |

\* cited by examiner

*Primary Examiner* — Kevin R Barss
(74) *Attorney, Agent, or Firm* — Paul J. Backofen, Esq.

(57) ABSTRACT

A dual-valve, valve core installation/removal tee enable the removal and or replacement of a Schrader® valve insert without evacuating the refrigeration system. The use of a dual-valve valve core installation/removal tee also permits the valve core to be removed and maintenance of the HVAC system to be performed without the flow restriction of the valve core and core depressor.

9 Claims, 5 Drawing Sheets

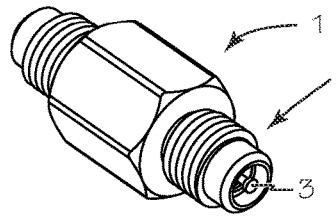
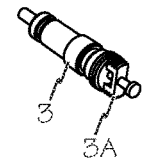
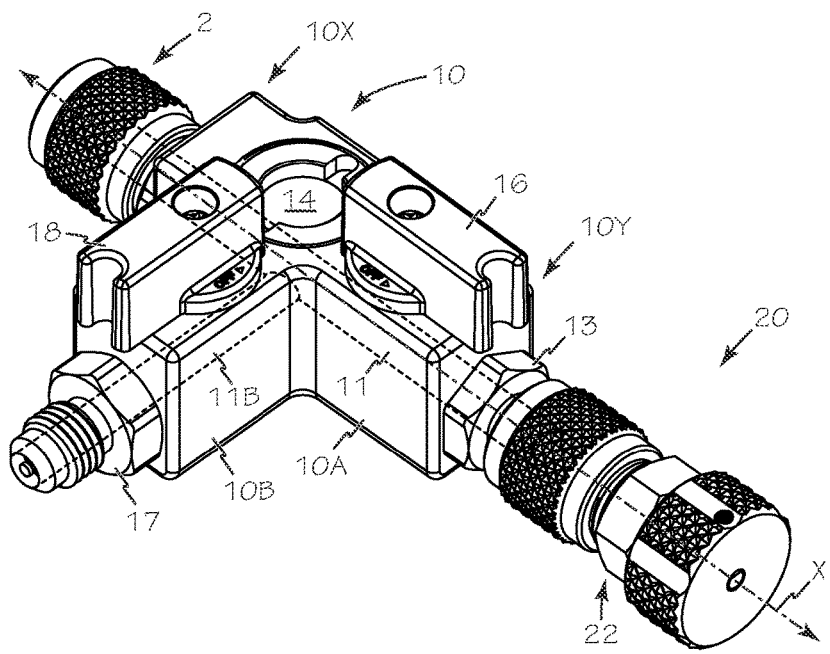
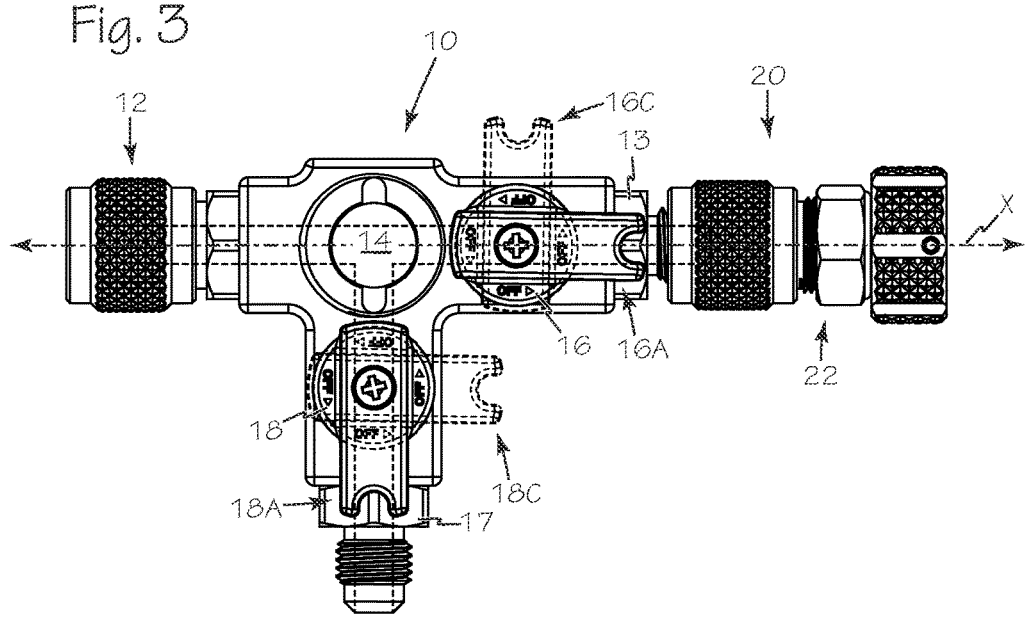

US 11,879,565 B1

METHOD AND APPARATUS FOR VALVE CORE INSTALLATION/REMOVAL

FIELD OF THE INVENTIONS

The inventions described below relate to the field of heating, ventilation and air conditioning equipment.

BACKGROUND OF THE INVENTIONS

Conventional heating, ventilation, air conditioning and refrigeration (HVACR) Schrader® valves are a connector to allow refrigerant to be introduced into an HVACR system or removed from an HVACR system. (Schrader® is a registered trademark of Sensata Technologies, Inc.) The Schrader® valve core is centrally located in the valve and spring-biased to a closed position preventing refrigerant from escaping. When a mating connector is attached, a centrally located "core depressor" pushes the top pin of the core, compresses the biasing spring and causes the valve to open, allowing refrigerant flow.

Some conventional core depressors are hollow to allow refrigerant flow, and others have a flat blade that threads into the inside surface of a gasket. The Schrader® valve and the core depressor are a limitation to the flow of refrigerant. Additionally, Schrader® valves need to be replaced periodically to maintain system integrity.

SUMMARY

The devices and methods described below provide for a method and a dual-valve, valve core installation/removal tee for removal and or replacement of a Schrader® valve insert without evacuating the refrigeration system. The use of a dual-valve, valve core installation/removal tee also permits the valve core to be removed and maintenance of the HVAC system to be performed without the flow restriction of the valve core and core depressor.

BRIEF DESCRIPTION OF THE DRAWINGS

FIG. 1A is a perspective view of a prior art flare fitting with a Schrader® valve.

FIG. 1B is a perspective view of a prior art Schrader® valve core.

FIG. 2 is a perspective view of the dual-valve, valve core removal tee.

FIG. 3 is a top plan view of the dual-valve, valve core removal tee of FIG. 2.

DETAILED DESCRIPTION OF THE INVENTIONS

Figure 4:
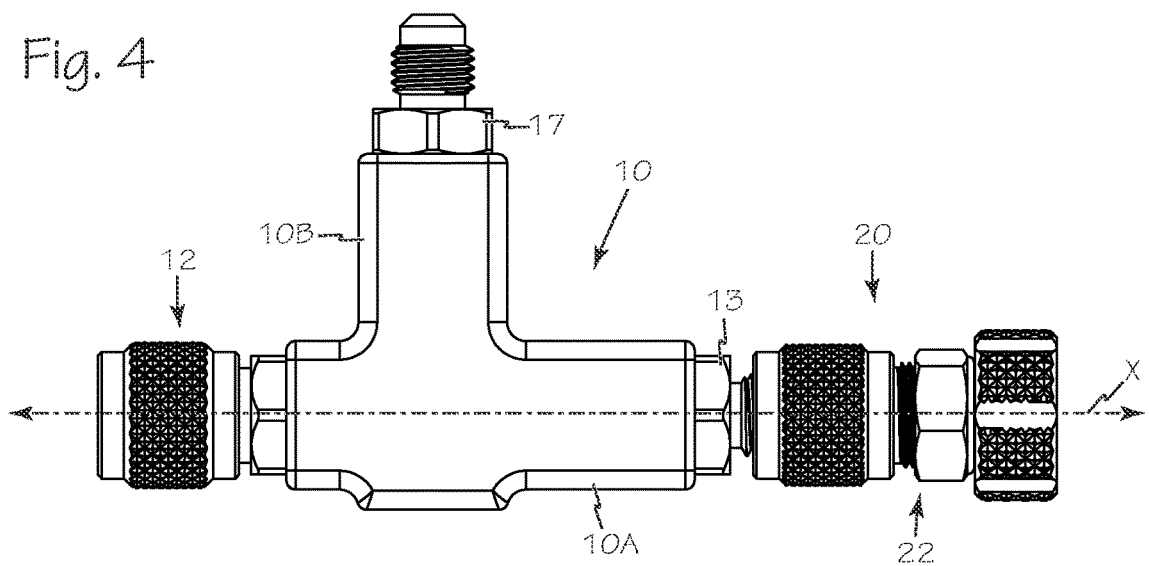
FIG. 4 is a bottom view of the dual-valve, valve core removal tee of FIG. 2.
Figure 5:
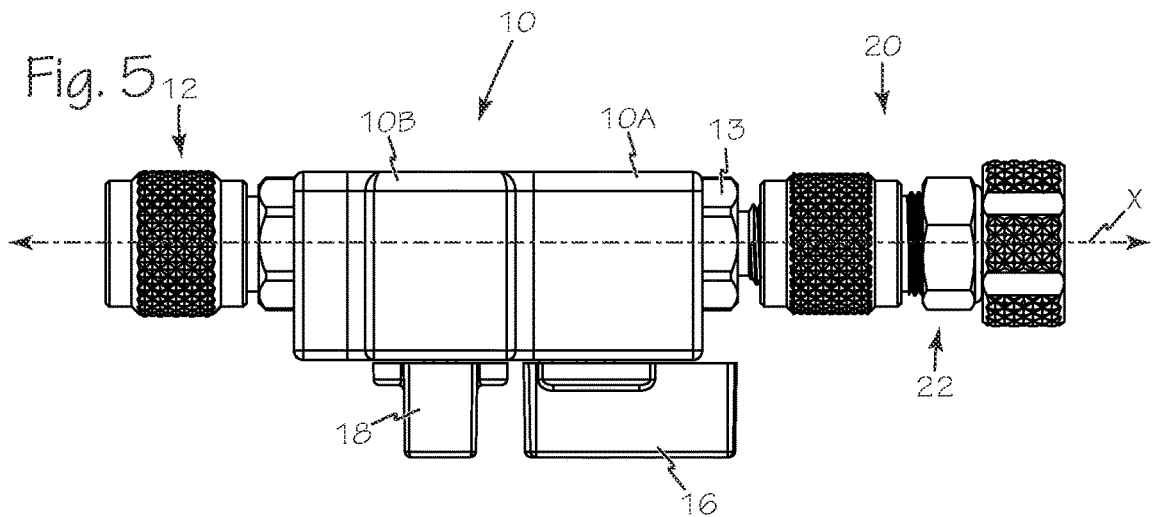
FIG. 5 is a right side view of the dual-valve, valve core removal tee of FIG. 2.
Figure 6:
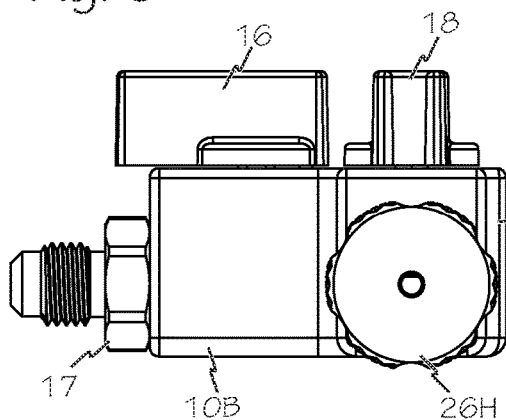
FIG. 6 is a front end view of the dual-valve, valve core removal tee of FIG. 2.
Figure 7:
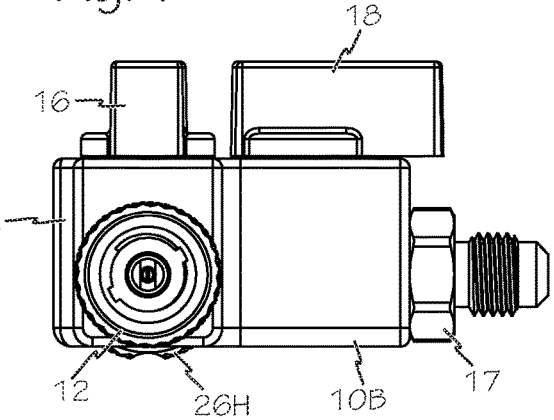
FIG. 7 is a back end view of the dual-valve, valve core removal tee of FIG. 2.
Figure 8:
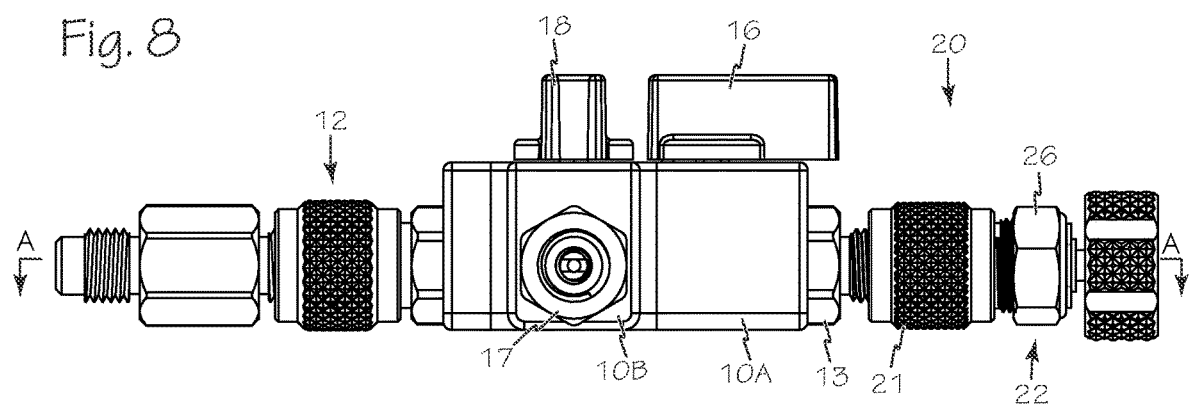
FIG. 8 is a is a left side view of the dual-valve, valve core removal tee of FIG. 2 engaging the flare fitting of FIG. 1.

FIG. 1A illustrates a prior-art flare fitting 1 equipped with a Schrader® valve 2. FIG. 1B illustrates the prior-art Schrader® valve core 3 of FIG. 1A exposing the valve core shoulders 3A which enable removal of the valve core from the Schrader® valve.

The dual-valve, valve core installation/removal tee 10 is illustrated in FIGS. 2 through 10. Dual-valve, valve core installation/removal tee 10 has a generally linear main body 10A with a longitudinal axis X colinear the main bore 11. Primary body 10A includes primary port 12 at a first end 10X of the main body and a secondary port 13 at the second end 10Y of the main body. A sight glass 14 between the primary port 12 and the secondary port 13 enables visibility into main bore 11. Primary valve 16 is oriented between the sight glass 14 and the secondary port 13 and is used to isolate secondary port 13 which is the valve core removal port from the primary port 12. In FIG. 3 primary valve 16 is illustrated in open position 16A and a dashed line illustration of the primary valve is shown in closed position 16C. A drain/fill or utility arm 10B attaches to primary body 10A perpendicular to the longitudinal axis X between the primary port 12 and the primary valve 16. Drain/fill arm 10B includes drain/fill port 17, secondary valve 18 and access bore 11B which puts drain/fill port 17 in fluid communication with primary bore 11. Secondary valve 18 enables closure of access bore 11B between drain/fill port 17 and primary bore 11. In FIG. 3 secondary valve 18 is illustrated in open position 18A and a dashed line illustration of the secondary valve is shown in closed position 18C.

Secondary or valve core removal port 13 is sized to accommodate the valve core installation/removal assembly 20. Valve core installation/removal assembly 20 is illustrate in FIGS. 10 through 15. Sight glass 14 permits a visual check of the removal and reinstallation of a valve core such as valve core 3 engaged on the distal end of the valve core removal assembly. Primary port 12 is sized to connect to the flare fitting 1 which is part of any suitable HVAC system. Primary valve 16 and secondary valve 18 are preferably ball valves, however, any suitable valve may be used.

Referring now to FIG. 10 through 15, valve core installation/removal assembly 19 includes attachment collar 21, with a friction control assembly 22, and valve core installation/removal assembly 23. Friction control assembly 22 engages attachment collar 21 and provides friction control of the valve core installation/removal assembly 23 when the primary valve is opened and the bore is pressurized.

Figure 9:
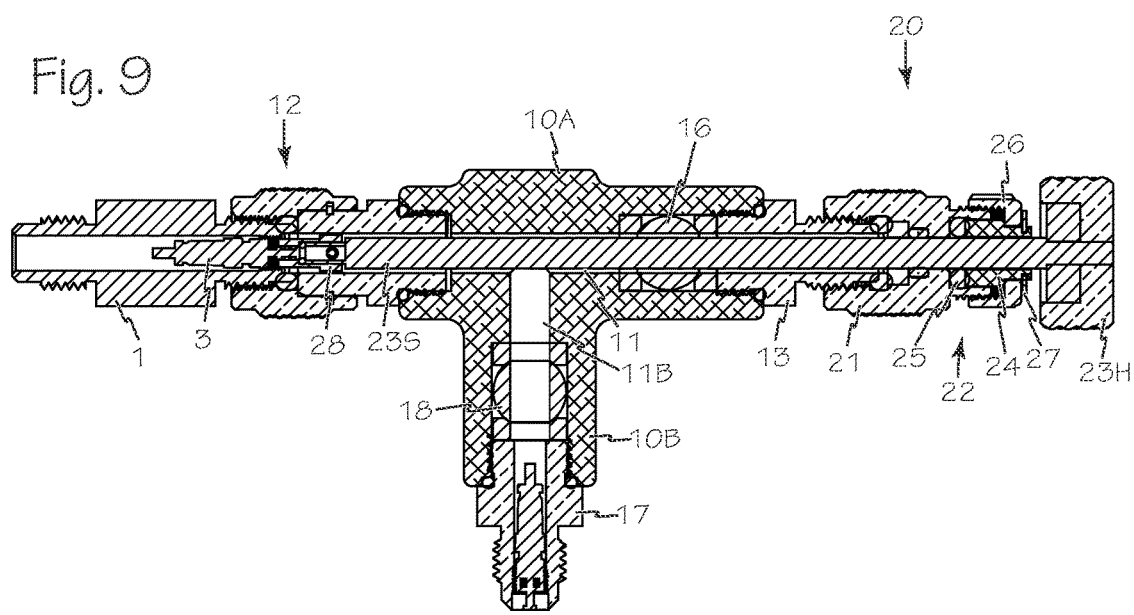
FIG. 9 is a cross-section view of the dual-valve, valve core removal tee and flare fitting of FIG. 8 taken along A-A.
Figure 10:
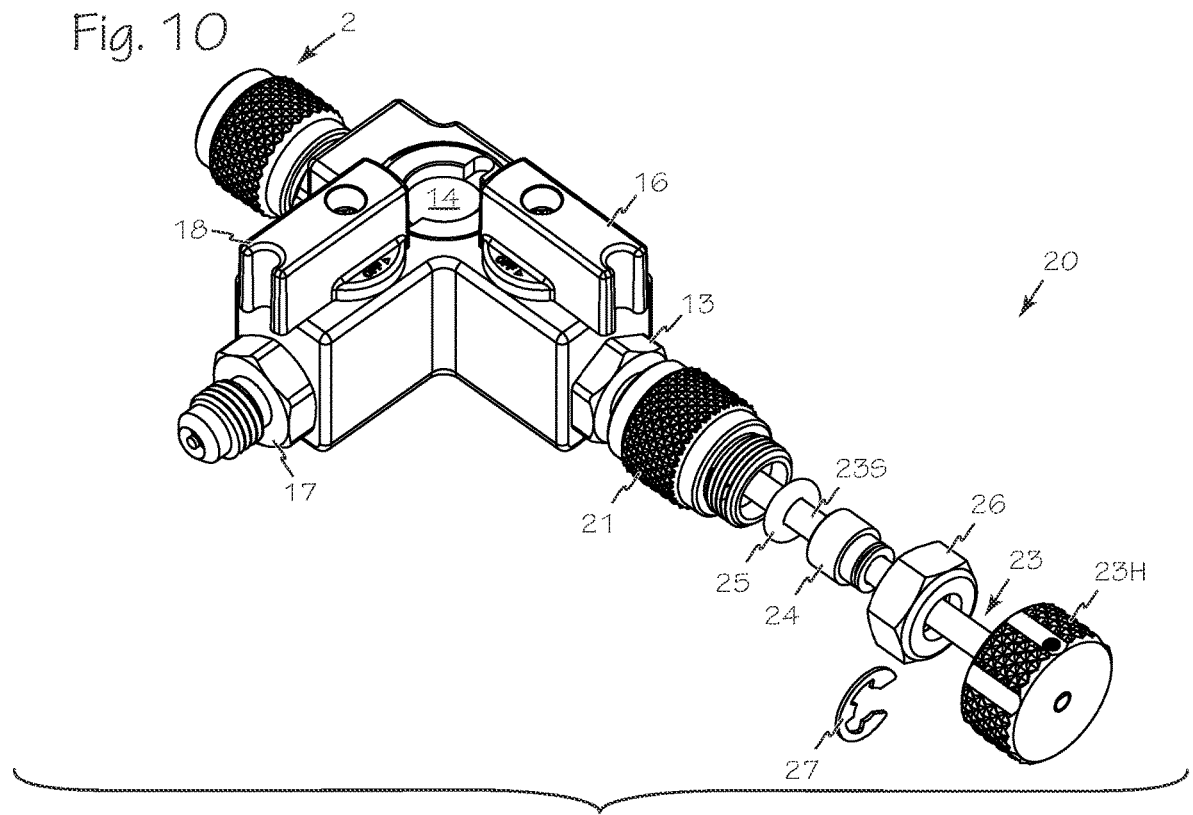
FIG. 10 is an exploded perspective view of the dual-valve, valve core removal tee of FIG. 2 with the components of the valve core removal arm exposed.
Figure 11:
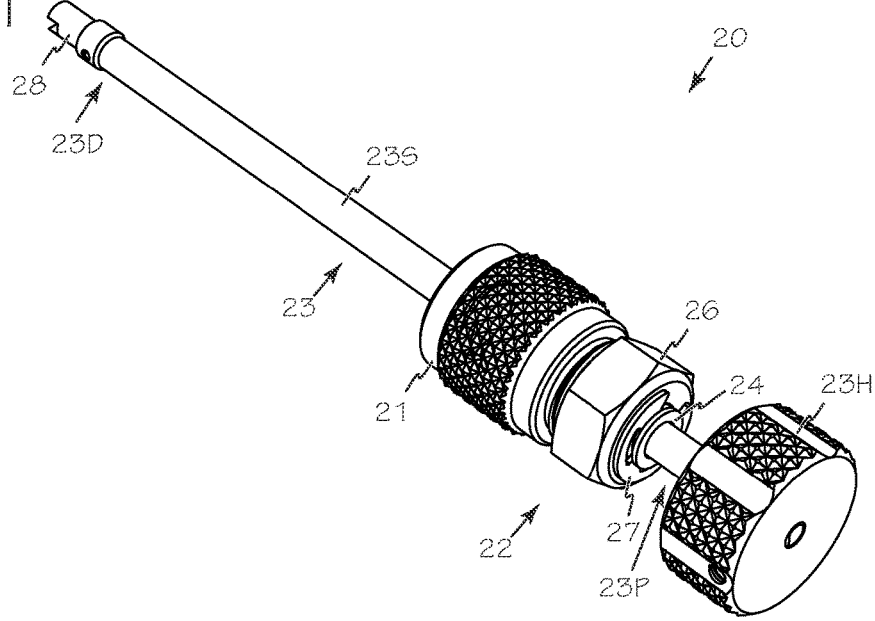
FIG. 11 is a top-right perspective view of a valve core removal arm.
Figure 12:
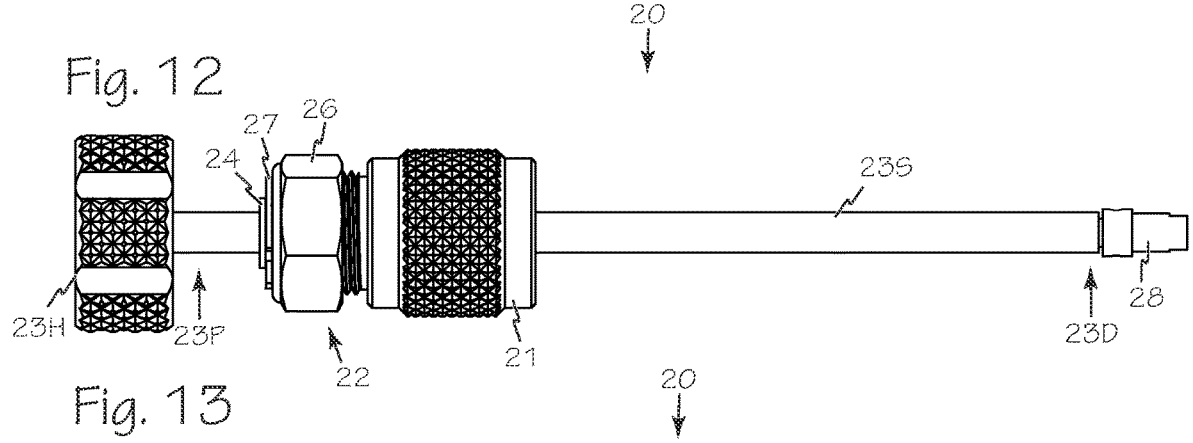
FIG. 12 is a side view of the valve core removal arm of FIG. 11.
Figure 13:
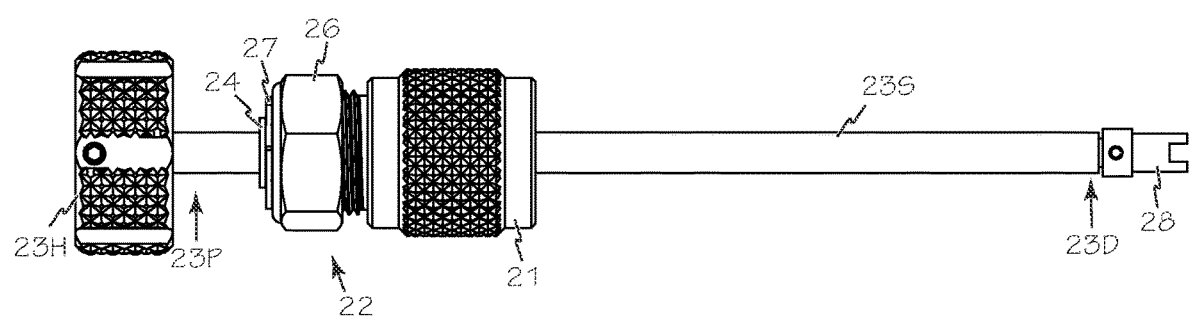
FIG. 13 is a top view of the valve core removal arm of FIG. 11.
Figure 14:
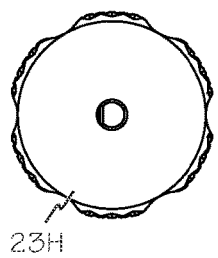
FIG. 14 is a front end view of the valve core removal arm of FIG. 11.
Figure 15:
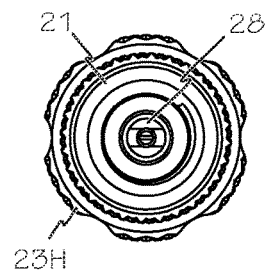
FIG. 15 is a rear end view of the valve core removal arm of FIG. 11.

Friction control assembly 22 includes friction control sleeve 24, O-ring 25, friction control cap 26 and lock ring 27. The friction control sleeve 24 is secured to the friction control cap 26 using lock ring 27 as illustrated in FIGS. 9 and 11. As illustrated in FIGS. 11, 12 and 13, the valve core installation/removal assembly 23 includes shaft 23S secured to magnetic handle 23H at the proximal end 23P of the shaft and valve core engagement tool 28 secured on the distal end 23D of the shaft 23S. Magnetic handle 23H enables the valve core installation/removal shaft to be magnetically secured to the housing of an HVAC system, or any other suitable ferrous surface, to keep the valve core installation/removal shaft and an engaged valve core clean and off the ground and or any surrounding surfaces during HVAC maintenance.

In use, to remove a Schrader® valve core from an HVAC flare fitting such as flare fitting 1 using a dual-valve, valve core installation/removal tee 10 the primary valve 16 is opened, open position 16A, and the secondary valve 18 is closed, closed position 18C, and the primary port of the dual-valve, valve core installation/removal tee 10 is secured to flare fitting 1.

The friction control cap 26 is adjusted to maintain sufficient friction on the valve core installation/removal shaft 23S to prevent the shaft from extending dangerously fast when Schrader® valve core 3 is removed from flare fitting 1 and the pressure of the refrigerant is released into dual-valve, valve core installation/removal tee 10. With the friction control cap adjusted, the valve core installation/removal shaft handle 23H is pushed into the dual-valve, valve core installation/removal tee 10 with slight rotation until the valve core engagement tool 28 engages shoulders 3A of the valve core. With the valve core engagement tool 28 engaging the valve core 3, the valve core installation/removal shaft handle 23H is rotated to disengage the valve core 3 from the flare fitting 1. When the valve core is disengaged from the flare fitting 1 the pressure of the refrigerant will apply pressure to the valve core installation/removal shaft 23S and the shaft will begin to extend out or away from the flare fitting. The valve core installation/removal shaft 23S should be held with the valve core engagement tool 28 visible in the sight glass 14 to confirm that the Schrader® valve core is engaged to the valve core engagement tool 28. With confirmation that the valve core is secured to the valve core engagement tool, the valve core installation/removal shaft 23S should be extended as far as possible away from the dual-valve, valve core installation/removal tee 10.

With the valve core installation/removal shaft 23S in the fully extended position, the primary valve 16 is rotated into closed position 16C. The attachment collar 21 is removed from the secondary port 13 and the valve core installation/removal assembly 20 with the attached valve core 3 is removed from the dual-valve, valve core installation/removal tee 10 and the magnetic handle 23H of the valve core installation/removal shaft may be removably secured to any metal surface in the vicinity of the flare fitting to keep the valve core clean during the system maintenance.

The HVAC system may them be maintained through the secondary port 13 and or the drain/fill port 17 with the assistance of the primary valve 16 and the secondary valve 18.

The previous process may be performed in reverse order to insert and new Schrader® valve core or to reinstall the previously removed valve core.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A dual-valve, valve core installation/removal tee comprising:
   a generally linear body with a primary port at a first end and a secondary port at a second end of the generally linear body, a bore in fluid communication between the primary port and the secondary port, the generally linear body including a sight glass between the primary port and the secondary port configured to provide a view into the bore and an isolation ball valve between the sight glass and the secondary port, the secondary valve configured to isolate the secondary port from the bore;
   a utility arm configured to extend from the generally linear body perpendicular to the generally linear body, the utility arm includes a utility port in fluid communication with the bore and a secondary valve configured to isolate the utility port from the bore; and
   a valve core installation/removal assembly with an attachment collar sized to engage the secondary port, a valve core installation/removal shaft having a magnetic handle at a first end and a valve core engagement tool at a second end, the valve core engagement tool and the valve core installation/removal shaft sized to move through the primary and secondary ports, the primary valve and the bore, the valve core installation/removal assembly including a friction sleeve, an O-ring, a friction control cap and a lock ring configured to permit adjustable friction control of the movement of the valve core installation/removal shaft through the secondary port.

2. A valve core installation/removal tee comprising:
   a generally linear body with a primary port and a secondary port at a second end in fluid communication via a bore between the primary port and the secondary port, the generally linear body including a sight glass configured to provide a view into the bore and an isolation ball valve between the sight glass and the secondary port, the secondary valve configured to isolate the secondary port from the bore;
   a utility arm configured to extend perpendicular from the generally linear body, the utility arm having a utility port in fluid communication with the bore and a secondary valve configured to isolate the utility port from the bore; and
   a valve core installation/removal assembly having a valve core installation/removal shaft and a friction control assembly configured to permit adjustable friction control of the movement of the valve core installation/removal shaft through the secondary port; and
   a valve core engagement tool secured to the valve core installation/removal shaft.

3. The valve core installation/removal tee of claim 2 wherein the friction control assembly further comprises an attachment collar sized to engage the secondary port.

4. The valve core installation/removal tee of claim 3 wherein the friction control assembly further comprises:
   a friction sleeve;
   an O-ring;
   a friction control cap; and
   a lock ring configured to secure the friction sleeve to the friction control cap.

5. The valve core installation/removal tee of claim 2 wherein the valve core installation/removal shaft further comprises a magnetic handle.

6. A valve core installation/removal tee comprising:
a T-shaped body having a primary port, a secondary port and a utility port all in fluid communication through a bore;
a sight glass in the T-shaped body configured to provide visibility into the bore between the primary port and the secondary port;
a primary valve configured to isolate the bore from the secondary port;
a secondary valve configured to isolate the bore from the utility port; and
a valve core installation/removal assembly configured to extend through the primary valve from the secondary port through the primary port, the valve core installation/removal assembly further including a friction control assembly, wherein the friction control assembly further comprises an attachment collar sized to engage the secondary port.

7. The valve core installation/removal tee of claim 6 wherein the valve core installation/removal assembly further comprises a valve core installation/removal shaft with a magnetic handle.

8. The valve core installation/removal tee of claim 7 wherein the valve core installation/removal assembly further comprises a valve core engagement tool secured to the valve core installation/removal shaft.

9. The valve core installation/removal tee of claim 7 wherein the friction control assembly further comprises:
a friction sleeve;
an O-ring;
a friction control cap; and
a lock ring configured to secure the friction sleeve to the friction control cap.

* * * * *